United States Patent [19]

McConchie

[11] 4,425,558
[45] Jan. 10, 1984

[54] TIRE PRESSURE INDICATOR AND METHOD FOR DETECTING REDUCTION OF PRESSURE

[76] Inventor: William L. McConchie, McEntee Rd., R.D., Waitakere, New Zealand

[21] Appl. No.: 286,849

[22] Filed: Jul. 27, 1981

[30] Foreign Application Priority Data

Jul. 30, 1980 [NZ] New Zealand ................ 194506

[51] Int. Cl.³ .................................... B60C 23/00
[52] U.S. Cl. ............................ 340/58; 73/146.5; 73/146.8; 200/61.25; 340/515
[58] Field of Search ............ 340/58, 515; 200/61.25; 73/146.5, 146.8

[56] References Cited

U.S. PATENT DOCUMENTS 3,713,092 1/1973 Ivenbaum ........................ 340/58
3,757,294 9/1973 Schultz ...................... 200/61.25 X
4,059,823 11/1977 Martin et al. ..................... 340/58

Primary Examiner—David L. Trafton
Assistant Examiner—Joseph Nowicki
Attorney, Agent, or Firm—Holman & Stern

[57] ABSTRACT

A method and apparatus for detecting reduction in the pressure of a pnenumatic vehicle tire, particularly for multi-wheeled vehicles comprises a sealed housing fitted over the pneumatic tire valve adapted to depress the valve stem of a conventional pneumatic tire valve to release air into the sealed housing and provide a pressurized chamber. The pressure in the housing operates a pressure sensitive member such that when the pressure is reduced, the pressure sensitive member operates contact points to activate a transmitter or other warning device provided in the housing. In one preferred embodiment a sonar transmitter activated by the pressure sensitive member operates a sonar receiver in the vehicle to provide a visual and/or audible warning signal to the operator of the vehicle as to the loss of pressure in any particular vehicle tire.

17 Claims, 3 Drawing Figures

TIRE PRESSURE INDICATOR AND METHOD FOR DETECTING REDUCTION OF PRESSURE

BACKGROUND OF THE INVENTION

1. Field of the Invention

This invention concerns improvements in or relating to valves and warning apparatus, and more particular concerns a valve incorporating a warning apparatus particularly for detecting a reduction in pressure of a pneumatic tire, for a vehicle.

2. Description of the Prior Art

It has been known to provide warning apparatus for use in conjunction with pneumatic tires to provide a warning of loss of pressure in a tire, generally caused by a puncture or a blow-out in the tire. However, such devices as have been known, have generally provided an audible signal in the nature of a whistle, or alternatively an electronic signal. The particular disadvantage of such signals is that the apparatus is most often used on a large multi-wheeled vehicle, and the audible noise is often insufficient to be detected by the operator of the vehicle. Furthermore, such devices as have been known, have been of complex and expensive construction.

BRIEF SUMMARY OF THE INVENTION

It is an object of this invention to provide an apparatus which is capable of detecting a loss of pressure in a pneumatic tire and which is particularly adapted to provide an apparatus which is convenient and efficient in use and in which malfunctions are readily detected.

According to this invention there is provided an apparatus for detecting a reduction of the pressure in a pneumatic tire with a valve, including a sealable housing positionable over an opening of said tire valve, a release member therein capable of opening the head of the tire valve from the valve seat to release air into said housing, a pressure sensitive member being provided in said housing adapted to activate a warning apparatus, the arrangement being such that in use, the apparatus may be positioned on a tire valve to open same and permit pressurization of said housing which positions said pressure sensitive member such that said warning apparatus is not activated, and wherein a predetermined reduction of said pressure will operate said pressure sensitive member to activate said warning apparatus.

Further according to this invention there is provided a method of detecting a reduction in pressure in a pneumatic tire with a valve, including the positioning of a sealable housing over an opening of said valve, which housing is adapted to open same and permit pressurization of said housing so as to operate a pressure sensitive member, and wherein a reduction of said pressure will operate said pressure sensitive member to activate said warning apparatus.

Further according to this invention there is provided a method of detecting a reduction of a predetermined pressure in a pneumatic tire with a valve, as disclosed in the preceding paragraph, and wherein said warning apparatus is a sonar transmitter provided in said housing, with a remotely positioned sonar receiver being operable as or including a warning apparatus.

BRIEF DESCRIPTION OF THE DRAWINGS

Other objects and advantages of this invention will become apparent from the ensuing description which is given by way of example only and with reference to the accompanying drawings wherein.

DETAILED DESCRIPTION

Figure 1:
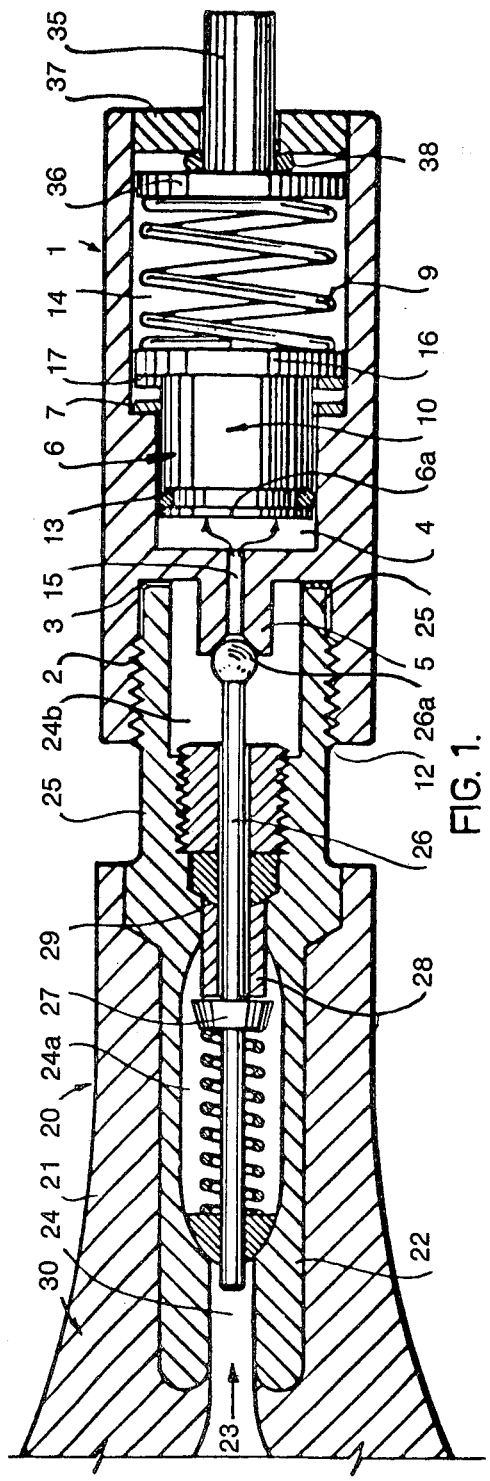
FIG. 1 is a longitudinal cross-sectional view of the preferred embodiment of the apparatus according to the present invention.

The invention provides a method of detecting reduction in a pressure in a pneumatic tire valve, particularly when used upon a vehicle, and more especially in relation to multi-wheeled vehicles such as trucks, semi-trailers and trailered vehicles. A housing is provided to be fitted over the pneumatic tire valve with an arrangement being provided in the housing to depress the air release needle of the conventional valve so as to release air into the housing which is so sealed that the housing may be thereby pressurized. The pressure in the housing operates a pressure sensitive member so that when the pressure is reduced, the pressure sensitive member operates through contact points to activate a transmitter such as a sonar transmitter or other warning device which is also provided in the housing.

In the preferred method of the invention the sonar transmitter is adapted to operate a receiver which may preferably be located close to the operator of the vehicle, and for example on the dash board of a vehicle in a suitable configuration which may provide for a visual and/or audible warning signal to be transmitted to the operator of the vehicle. The arrangement may furthermore be such that the apparatus is provided with a screen with a number of light warning indicators corresponding to the groupings of tires on the vehicle so that the operator is aware both of the reduction in pressure of one tire, and of its location on the vehicle.

It has been found that there are a number of possible alternatives for a construction of an apparatus capable of effecting the methods of the present invention. However, reference will be directed to the drawings in which at least two preferred embodiments are described, with reference to some possible alternatives that may be envisaged in relation to the application of the method of the invention.

The invention in one preferred embodiment includes an apparatus with a housing generally indicated by arrow 1, which may be sealably positioned over the outer end of a known type pneumatic tire valve apparatus which is generally indicated by arrow 20.

The known type of pneumatic tire valve used in conjunction with the invention may be of the type generally used with a conventional tire tube, or with a tubeless type tire. These valve apparatus generally include a resilient rubber base portion 21 formed integrally with or joined into the surface 30 of the tube of the vehicle, or alternatively sealably provided through the rim in tubeless type vehicle tires. The valve casing 22 is then sealably provided in the base portion and includes an inlet 23 to an elongate bore 24 extending through the valve casing 22 to the head portion 25, and includes a valve chamber 24a and an open end 24b. A valve stem 26 is then provided through the elongate bore 24 and is provided with a valve head 27 adapted to suitably close on valve seat 28, with a spring arrangement being provided in said valve chamber 24a urge said valve head against the valve seat, which valve seat is also sealably positioned in the neck 29 of the valve.

The valve stem or needle 26 is provided with a head 26a which depends outwardly into the open end 24b of the valve casing. It will be appreciated that the depression of this head 26a, opens the valve head 27 from the seat 28 so as to permit inflation of the pneumatic tire, and also to permit air to escape from the valve once the pneumatic tire has been so inflated or pressurized.

The invention to be used in conjunction with this type of tire valve therefore provides that the housing 1 may be provided with an internal thread 2 such that it can be screwed over the outer portion 25 of the valve means. Furthermore, a seal means 3 may optionally be provided to sealably enclose the housing over the valve means to provide an enclosed chamber 4 within said housing.

The invention then includes a release member 5 which in the preferred embodiment of the invention is integrally formed as a portion of the housing and which extends into the open end 12 of the housing which is screwed over the outer portion 25 of the valve means. The arrangement is such that as the housing is screwed over and sealed against the outer portion 25 of the valve means, the release member 5 is adapted to engage the head of the valve stem 26 and depress same against the valve spring arrangement, so that the head 27 of the valve means is partially released from the valve seat to permit air to escape from the valve and into the housing.

The preferred embodiment of the invention includes a release member which is adapted to engage the head 26a of the valve stem by providing a castilated head portion, through the center portion of which, or adjacent which there may be provided a port or a plurality of ports 15 extending into the chamber 4 of the housing.

The arrangement is therefore such that the release member 5 is adapted to depress the head 26a of the valve stem so as to partially open the valve and permit air to escape from the valve through the port 15 and into the chamber 4 so as to pressurized same.

The arrangement then provides for a pressure sensitive member, which may be a pressure sensitive disc, diaphragm or the like which is activated by the pressure within the chamber. In the preferred embodiment of the invention the pressure sensitive member may be comprised of a piston generally indicated by arrow 6, with the base portion 6a comprising an end of the chamber 4, and being provided with a suitable seal means 13 between the side of the piston and the side of the chamber 4. Therefore, the piston 6 is adapted to slide within the chamber 4 and is provided on its other end with a head portion 16. The head portion 16 is adapted to slide within an outer portion of the chamber 14, and in the preferred form of the invention the head portion 16 of the piston is provided with contact points 17 on its rear side which are capable of contacting corresponding points 7 provided in the base of the outer chamber 14. The apparatus furthermore provides for a counterspring member 9 which is provided within the outer chamber 14 and is adapted to provide counter pressure to the air pressure exerted within the chamber 4. It will be appreciated that the tension within the counter spring 9 is predetermined to counteract the air pressure exerted against the base 6a of the piston, a sufficient amount such that when there is a decrease in the pressure within the chamber 4, the tension within the counterspring 9 is sufficient to move the piston to close the contact points 7 and 17.

Furthermore, the invention according to the preferred embodiment includes a signal transmitter generally indicated by arrow 10 which in the preferred embodiment of the invention may be a sonar transmitter or possibly an electronic or ultra-high frequency or audible transmitter. It will be appreciated that the transmitter may be provided on any portion of the apparatus in communication with the contact points 7 and 17 which are adapted to activate the transmitter, and that the positioning of the transmitter within the piston 6 is a matter of convenience in terms of the manufacture of the apparatus.

According to the preferred embodiment of the invention there is also provided a second piston member 35 which is provided in the outer end of secondary chamber 14, with the head 36 of the piston engaged with the outer end of the counterspring 9. The body of the piston 35 is adapted to extend through bore 37 provided on the outer end of the housing and appropriate seal means 38 may be provided to prevent escape of any air which passes through the circular seal provided on the primary piston 6. The arrangement of the testing apparatus as described in this embodiment of the invention is such that the body portion 35 of the piston may be depressed so as to compress the counterspring member 9, a sufficient amount to close the contact points of the piston with the fixed contact points 7 and to operate the transmitting apparatus. This then provides an immediate indication as to whether or not the apparatus is in working condition.

The arrangement of the invention is such that the pneumatic tire may be pressurized in the manner known in the art by filling the tire through the filling valve 20. The housing 1 is then screwed over the end portion of the conventional valve, so that the release member comes into contact with the head of the valve stem and partially opens the valve so as to release air into the chamber 4 of the housing. This air pressure displaces the piston to the position shown in FIG. 1 of the drawings wherein the contact points 17 are spaced apart from the contact points 7 so that the apparatus is in operable condition. It will be appreciated that only a minimal amount of opening the valve head from the valve stem is required to pressurize the housing. Further, this "open" position of the valve head is maintained by the location of the housing on the valve. Furthermore, the position of the piston is maintained by the counterspring apparatus. It will also be appreciated that the apparatus of the invention may then be tested by using the secondary piston member 35 to depress the counterspring 9 and move the piston such that the contact points are closed to activate the transmitter.

Therefore, following the fitting and testing of the apparatus, it remains in an inactivated state until there is a reduction in the predetermined pressure of the valve which causes the loss of pressure in the chamber 4 so as to permit the contact point 17 of the piston to contact its cooperative contact point 7 so as to complete appropriate circuitry and activate the transmitter 10.

It will be appreciated that the apparatus is completely adjustable by adjusting the tension in the counterspring 9, and that the amount to which the valve 20 is opened is determined by the positioning of the cap or housing 1 over the end of the valve. It will of course be appreciated that in preferred embodiments of the invention the release member 5 will extend into the open end of the apparatus a sufficient distance such that the stem 26a of the head portion of the valve apparatus is opened only when the outwardly directed portion 25 of the valve is properly secured within the apparatus of the invention.

Figure 3:
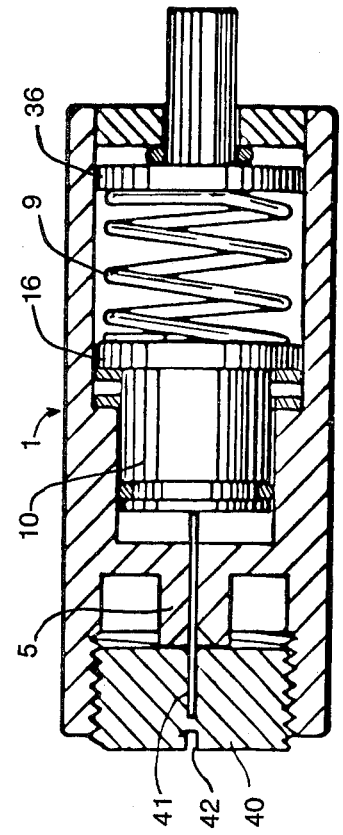
FIG. 3 is a cross-sectional view of the present invention in a packaged form ready for use.

It is also envisaged that the apparatus of the invention may be packaged such that it is ready for installation as may be required. However, it will be appreciated that the preferred form of the apparatus as shown in FIG. 1 of the drawings would provide that the contact points were always closed when the piston was not activated by pressure within the chamber 4. The preferred embodiment of the invention therefore includes an arrangement as shown in FIG. 3 of the drawings where the apparatus is manufactued before installation. This drawing includes the preferred embodiment of the invention as shown in FIG. 1 and provides a plug means generally indicated by arrow 40 being a screw type plug which is adapted to screw into the open end 12 of the housing and is provided with an inwardly depending pin portion 41 which extends through the port 15 and abuts against the base 6a of the piston member. The arrangement is such that the threaded insertion of the plug 40 means that the pin 41 thereof moves the piston 6 of the apparatus to open the contact point 17 from contact point 7 and thus deactivate the transmitter 10. By this arrangement, the transmitter is only activated when it is in use. It will of course be readily appreciated that the plug member which includes a screw type head with an appropriate recess 42 may be screwed out from the open end 12 of the housing and the apparatus may then be immediately screwed on to an appropriate valve.

Figure 2:
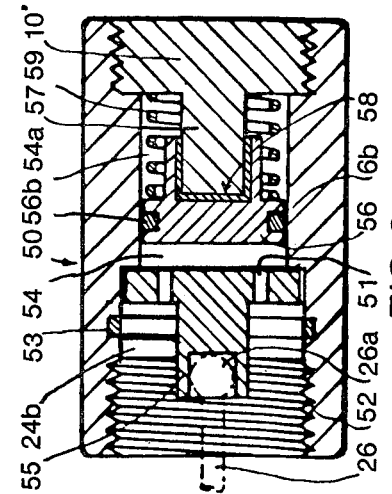
FIG. 2 is a cross-sectional view of a second embodiment of the apparatus according to the present invention.

Furthermore, alternative embodiments of the invention may be provided as are shown in FIG. 2 of the drawings in which there is provided a housing 50 provided with an internal thread 52 such that it can be screwed on to the outer portion 25 of a valve means as shown in FIG. 1 of the drawings. Further, a seal member 53 may be provided to suitably enclose a chamber 54 within said housing.

The invention then includes a release member 55 which may preferably be fixed to the housing 50 and which will engage the head 26a of a valve stem and depress same against the valve spring arrangement so that the head 27 of the valve is partially released from the valve seat to permit air to escape from the valve and into the chamber 54 of the housing 50. The air which so escapes may pass through ports 51 in the base portion of the release member and into a piston chamber so as to provide pressure upon the head of a piston 56. The piston is itself provided in a close fitting arrangement with the corresponding sides of a portion 54a of the chamber and in preferred embodiments is provided with a seal 56b about said piston. Further, the piston 56 may be adapted to slide over a contact portion 57, with contact surfaces generally indicated by arrow 58 being provided between adjacent faces of the piston 56 and the contact portion 57. The arrangement is such that the air pressure which is released into the chamber 54 will close the piston 56 against the contact 57 so as to close contact points 58 as shown in FIG. 2 of the drawings. This arrangement also causes depression of the counterspring member 59.

This apparatus includes a signal transmitter generally indicated by number 10′ which may preferably be a sonar transmitter or other suitable transmitter as described which is screwed into the outer end of the housing or is otherwise suitably fixed therein.

The arrangement of this embodiment is such that the air pressure closes the piston 56 against the contact portion 57 so as to deactivate the transmitter apparatus, with the circuitry being reversed in operation to that disclosed with the embodiment shown in FIG. 1 of the drawings. Thereafter, the apparatus remains in an inactivated state until there is a reduction in the predetermined pressure in the valve, whereupon the counterspring 59 opens the contact between the base of the pistons 56 and the contact point 57 so as to open an appropriate circuit and activate the transmitter 10′.

It will be appreciated that this embodiment of the apparatus, as with the embodiment in FIG. 1 of the drawings, is adjustable by adjusting the tension in the counterspring (9 or 59 respectively), and that the amount to which the valve 20 is opened is determined by the position of the cap or housing 1 over the end of the valve.

It is also to be appreciated that other examples may be envisaged whereby the housing is provided as two separate caps with a first cap including the release member 5 and being locatable over the end of the valve mechanism and including ports similar to those shown in FIGS. 1 and 2 of the drawings into a chamber, and wherein according to such alternative embodiments a second housing might be provided which includes the piston arrangement and the transmitter 10.

It is also to be appreciated that various types of contacts might be contemplated and that the apparatus may be adapted to be operated dependent upon the opening or closing of the contacts as may be required.

Thus, by this invention there is provided an apparatus which is capable of detecting a reduction in pressure in a pneumatic tire and which is capable of activating a transmitter apparatus capable of operating a warning apparatus which may be provided in a position where it can be readily observed by the operator or driver of the vehicle.

Finally, it will be appreciated that the method and the apparatus of the invention have been described by way of example only and that modifications, alterations and additions may be made to the invention without departing from the scope thereof.

I claim:

1. An apparatus for detecting a reduction of the pressure in a pneumatic tire with a valve, including a sealable housing positionable over an opening of said tire valve, a release member therein adapted to open the head of the tire valve from the valve seat to release air into said housing, a pressure sensitive member being provided in said housing adapted to activate a warning apparatus, the arrangement being such that in use, the apparatus may be positioned on a tire valve to open same and permit pressurization of said housing which positions said pressure sensitive member such that said warning apparatus is not activated and wherein a predetermined reduction of said pressure will operate said pressure sensitive member to activate said warning apparatus, and a testing means for independently activating the pressure sensitive member to test the operation of said warning apparatus.

2. An apparatus for detecting a reduction in pressure in a pneumatic tire valve as claimed in claim 1 wherein said sealable housing is provided with a threaded recess adapted to be screwed over the opening of a pneumatic tire valve, with a release means being provided in said housing adapted to depress and open the head of the tire valve from the valve seat to release air into, and permit pressurization of said housing.

3. An apparatus for detecting a reduction in pressure in a pneumatic tire with a valve as claimed in claim 1 wherein said pressure sensitive member is biased against the pressure in said housing.

4. An apparatus for detecting a reduction in pressure in a pneumatic tire with a valve as claimed in claim 3 wherein said pressure sensitive member is a piston member which is provided with a bias by a counterspring member.

5. An apparatus for detecting a reduction in pressure in a pneumatic tire with a valve as claimed in claim 3 wherein said pressure sensitive member activates a contact switch, which is a part of, or is provided to actuate a warning apparatus.

6. An apparatus for detecting a reduction in pressure in a pneumatic tire with a valve as claimed in claim 3 wherein said warning apparatus is a sonar or other high frequency transmitter.

7. An apparatus for detecting a reduction in pressure in a pneumatic tire with a valve as claimed in claim 6 wherein said warning apparatus includes a remotely positioned receiver operating as or including a visual and/or audible warning apparatus.

8. An apparatus for detecting a reduction of the pressure in a pneumatic tire with a valve as claimed in claim 1 wherein said warning apparatus includes a sonar or other high frequency transmitter which is provided in or adjacent the pressure sensitive member in said apparatus.

9. An apparatus for detecting a reduction of the pressure in a pneumatic tire including a valve as claimed in any one of claims 1, 2, 3, 4, 5, 6, 7 or 8, wherein said detecting apparatus is removable from said tire and includes a removable plug engageable in the end of said sealable housing which is positionable over said tire valve opening, said plug defining means for maintaining said warning apparatus in a de-activated state.

10. A method for detecting a reduction in pressure in a pneumatic tire having an inflation valve comprising, sealingly attaching one end of a housing member for a reduced pressure detector to said valve and simultaneously opening said valve permitting the tire pressure to exert a force on the detector, adjusting the setting of the detector so that it will produce a signal when the pressure is reduced to a predetermined value, producing a signal when the pressure is reduced to said predetermined value, producing a warning in response to said signal, and testing the operation of said detector and warning by exerting a separate independent force on said detector opposite to that exerted on the detector by the tire pressure which is sufficient to activate the detector to produce said signal.

11. A method for detecting a reduction in pressure in a pneumatic tire as claimed in claim 10 wherein said attaching comprises screwing said housing member over the opening of the tire valve, and wherein said valve has a valve stem and said opening of said valve comprises depressing said valve stem by said housing to move said valve from the valve seat to release air into and pressurize said housing.

12. A method for detecting a reduction in pressure in a pneumatic tire as claimed in claim 10 wherein said detector is a pressure sensitive member, and further comprising resiliently biasing said pressure sensitive member against the pressure in said housing.

13. A method for detecting a reduction in pressure in a pneumatic tire as claimed in claim 12 wherein said pressure sensitive member is a piston in a cylinder in the housing, said tire pressure force is produced on one end of the piston and said biasing comprises applying a spring force against the other end of the piston.

14. A method for detecting a reduction in pressure in a pneumatic tire as claimed in claim 13 wherein said detector signal is produced by providing a contact switch on said piston and cylinder and operating said switch by displacing said piston a predetermined amount.

15. A method for detecting a reduction in pressure in a pneumatic tire as claimed in claim 10 wherein producing said signal comprises actuating a sonar or other high frequency transmitter.

16. A method for detecting a reduction in pressure in a pneumatic tire as claimed in claim 15 wherein producing said warning comprises remotely activating a receiver and producing a visual and/or audible warning by said receiver.

17. A method for detecting a reduction in pressure in a pneumatic tire as claimed in any one of claims 10, 11, 12, 13, 14, 15, or 16 and further comprising, prior to use inserting a removable plug in the end of the housing member to be attached to the valve, maintaining the detector in a de-activated position by said inserted plug, and removing the plug just prior to said attaching step for use.

* * * * *